(12) United States Patent
Ye et al.

(10) Patent No.: US 11,767,464 B2
(45) Date of Patent: Sep. 26, 2023

(54) CONSOLIDATION AND WELLBORE STRENGTH ENHANCEMENT WITH CACO₃ PRECIPITATION

(71) Applicant: HALLIBURTON ENERGY SERVICES, INC., Houston, TX (US)

(72) Inventors: Xiangnan Ye, Cypress, TX (US); Cato R. McDaniel, Montgomery, TX (US); Dale E. Jamison, Humble, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 17/306,793

(22) Filed: May 3, 2021

(65) Prior Publication Data
US 2021/0253939 A1    Aug. 19, 2021

Related U.S. Application Data

(63) Continuation of application No. 16/338,074, filed as application No. PCT/US2016/058203 on Oct. 21, 2016, now abandoned.

(51) Int. Cl.
*E21B 33/138* (2006.01)
*C09K 8/57* (2006.01)
*C09K 8/72* (2006.01)
*E21B 21/00* (2006.01)
*E21B 37/00* (2006.01)

(52) U.S. Cl.
CPC ............... *C09K 8/572* (2013.01); *C09K 8/72* (2013.01); *E21B 21/003* (2013.01); *E21B 33/138* (2013.01); *E21B 37/00* (2013.01)

(58) Field of Classification Search
CPC ..... C09K 8/572; E21B 21/003; E21B 33/138; E21B 37/00
See application file for complete search history.

(56) References Cited

U.S. PATENT DOCUMENTS 3,205,946 A * 9/1965 Prats ................... E21B 33/138
166/288
3,593,796 A   7/1971 Stainback et al.
(Continued)

FOREIGN PATENT DOCUMENTS

WO        2015153407 A1    10/2015

OTHER PUBLICATIONS

International Search Report and Written Opinion; PCT Application No. PCT/US2016/058203; dated Jul. 20, 2017.

*Primary Examiner* — Silvana C Runyan
(74) *Attorney, Agent, or Firm* — NOVAK DRUCE CARROLL LLP (57) ABSTRACT

A method of treating a wellbore in a subterranean formation including introducing a first fluid into a formation, wherein the first fluid comprises: a first water soluble salt and a carrier; placing a second fluid into the formation, wherein the second fluid comprises: a second water soluble salt and a carrier, wherein the first fluid and second fluid produce a solid precipitate upon contact; and allowing the solid precipitate to form in-situ in the formation. An acid may be added to the wellbore after formation of the precipitate. The method may be also used for stabilizing a wellbore during drilling, and shutting off and reopening a region in a formation.

20 Claims, 4 Drawing Sheets

(56) References Cited

U.S. PATENT DOCUMENTS

| | | | |
|---|---|---|---|
| 4,081,029 A * | 3/1978 | Holm | C09K 8/5045 |
| | | | 166/292 |
| 5,018,578 A * | 5/1991 | El Rabaa | E21B 43/162 |
| | | | 166/308.1 |
| 5,168,928 A | 12/1992 | Terry et al. | |
| 6,554,067 B1 * | 4/2003 | Davies | E21B 43/025 |
| | | | 166/276 |
| 6,889,780 B2 | 5/2005 | Whitfill et al. | |
| 10,202,531 B2 | 2/2019 | McDaniel et al. | |
| 2003/0195120 A1 | 10/2003 | Halliday et al. | |
| 2013/0126159 A1 * | 5/2013 | Bryan | E21B 33/14 |
| | | | 166/279 |
| 2014/0209307 A1 | 7/2014 | Jamison et al. | |
| 2016/0068733 A1 * | 3/2016 | Jamison | C09K 8/032 |
| | | | 166/300 |

\* cited by examiner

CONSOLIDATION AND WELLBORE STRENGTH ENHANCEMENT WITH CACO₃ PRECIPITATION

CROSS-REFERENCE TO RELATED APPLICATIONS

This application is a continuation of U.S. application Ser. No. 16/338,074, filed Mar. 29, 2019, which claims benefit to national stage entry of PCT/US2016/058203, filed Oct. 21, 2016, said application is expressly incorporated herein in its entirety.

BACKGROUND

The present invention generally relates to the use of precipitates in subterranean operations, and, more specifically, to soluble salts, and methods of using these soluble salts in subterranean operations.

A drilling fluid or mud is a specially designed fluid that is circulated through a wellbore as the wellbore is being drilled to facilitate the drilling operation. The various functions of a drilling fluid include removing drill cuttings from the wellbore, cooling and lubricating the drill bit, aiding in support of the drill pipe and drill bit, and providing a hydrostatic head to maintain integrity of the wellbore walls and to prevent wellbore blowouts. Specific drilling fluid systems are selected to optimize a drilling operation in accordance with the characteristics of a particular geological formation. Because of the diversity of geological formations encountered in the oil and gas industry, drilling fluids usually are custom-blended to provide the specific rheology and other properties required for each situation. Generally, drilling fluid systems are complex compositions of liquids (i.e., water, petroleum oil, or synthetic oil or other synthetic fluid), dissolved inorganic and/or organic additives, and suspended, finely divided solids of various types.

Formation damage due to invasion by drilling fluids is a well-known problem in drilling. Invasion of drilling fluids into the formation can be caused by the differential pressure of the hydrostatic column which is generally greater than the formation pressure, especially in low pressure or depleted zones. Invasion is also caused or allowed by openings in the rock and the ability of fluids to move through the rock—the porosity and permeability of the zone. When drilling depleted sands under an overbalance condition, which may be several hundreds of pounds per square inch, mud pressure will penetrate progressively into the formation unless there is an effective flow barrier present at the wellbore wall. Horizontal drilling may also drill across highly fractured or permeable, low pressure or depleted zones, which increases the probability of the drill pipe getting stuck due to lying on the low side of the borehole. The exposure of numerous fractures or openings having low formation pressures has increased the problems of lost circulation and formation invasion.

Filtrate control mechanisms have long been used to control the movement of drilling fluids and filtrate into and through the formation openings. Such mechanisms traditionally involve adding particles to the drilling fluid, which are deposited onto the wellbore wall during circulation of the drilling fluid when drilling. These particles are commonly bentonite, starch, lignins, polymers, carbonates, graphitic materials, nutshells, fibrous materials, barite, drilled solids and various combinations of these. The particles form a filter cake on the borehole wall which provides a low permeable barrier. Such traditional solutions, however, have not been sufficient for eliminating or significantly reducing lost circulation and formation invasion of drilling fluids when drilling depleted sands, particularly depleted sands with overburden pressure amounting to several hundred pounds per square inch, or across highly fractured or permeable, low pressure or depleted zones. There continues to be a need for improved methods for drilling depleted sands.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to one having ordinary skill in the art and having the benefit of this disclosure.

DETAILED DESCRIPTION

Embodiments of the invention are directed to precipitating $CaCO_3$ in sandstone/shale formations. The methods and fluids described herein may result in enhanced wellbore strength and consolidation of sand particles.

General Measurement Terms and Definitions

Unless otherwise specified or unless the context otherwise clearly requires, any ratio or percentage means by volume.

If there is any difference between U.S. or Imperial units, U.S. units are intended. Unless otherwise specified, mesh sizes are in U.S. Standard Mesh.

The micrometer (μm) may sometimes be referred to herein as a micron.

The conversion between pound per gallon (lb/gal or ppg) and kilogram per cubic meter ($kg/m^3$) utilized herein is: 1 lb/gal=(1 lb/gal)×(0.4536 kg/lb)×(gal/0.003785 $m^3$)=119.8 $kg/m^3$.

As used herein, into a subterranean formation can include introducing at least into and/or through a wellbore in the subterranean formation. According to various techniques known in the art, equipment, tools, or well fluids can be directed from a wellhead into any desired portion of the wellbore. Additionally, a well fluid can be directed from a portion of the wellbore into the rock matrix of a zone.

Broadly, a zone refers to an interval of rock along a wellbore that is differentiated from surrounding rocks based on hydrocarbon content or other features, such as perforations or other fluid communication with the wellbore, faults, or fractures. A treatment usually involves introducing a treatment fluid into a well. As used herein, a treatment fluid is a fluid used in a treatment. Unless the context otherwise requires, the word treatment in the term "treatment fluid" does not necessarily imply any particular treatment or action by the fluid. If a treatment fluid is to be used in a relatively small volume, for example less than about 200 barrels, it is sometimes referred to in the art as a slug or pill. As used herein, a treatment zone refers to an interval of rock along a wellbore into which a treatment fluid is directed to flow from the wellbore. Further, as used herein, into a treatment zone means into and through the wellhead and, additionally, through the wellbore and into the treatment zone.

As used herein, into a subterranean formation can include introducing at least into and/or through a wellbore in the subterranean formation. According to various techniques known in the art, equipment, tools, or well fluids can be directed from a wellhead into any desired portion of the wellbore. Additionally, a well fluid can be directed from a portion of the wellbore into the rock matrix of a zone.

In one or more embodiments, a method of treating a wellbore in a subterranean formation includes: introducing a first fluid and a carrier into a formation, wherein the first fluid includes a first water soluble salt; introducing a second fluid and a carrier into the formation, wherein the second fluid includes a second water soluble salt, wherein the first water soluble salt and second water soluble salt produce a solid precipitate upon contact; and allowing the solid precipitate to form in-situ in the formation.

Carrier

As used herein, the term "carrier" refers to a water or a water-miscible but oleaginous fluid-immiscible compound. The carrier of the present embodiments can generally be from any source, provided that the fluids do not contain components that might adversely affect the stability and/or performance of the wellbore treatment fluids of the present disclosure. Illustrative aqueous fluids suitable for use in embodiments of this disclosure include, but are not limited to, fresh water, sea water, brines containing at least one dissolved organic or inorganic salt, liquids containing water miscible organic compounds, and combinations thereof, for example.

In various embodiments, the brines can include monovalent brines or divalent brines, for example. Suitable monovalent brines can include, for example, sodium chloride brines, sodium bromide brines, potassium chloride brines, potassium bromide brines, and the combinations thereof. Suitable divalent brines can include, for example, magnesium chloride brines, calcium chloride brines, calcium bromide brines, and combinations thereof. In one or more embodiments, the carrier can include a high density brine. As used herein, the term 'high density brine' refers to a brine that has a density of about 9.5-10 lbs/gal or greater (1.1 g/cm$^3$-1.2 g/cm$^3$ or greater).

It is contemplated that the carrier contacting the first fluid and the second fluid may be the same composition. Alternatively, different compositions may be utilized for each carrier.

Water Soluble Salts

The wellbore treatment fluids of the disclosure include a first water soluble salt in a carrier and a second water soluble salt in a carrier. As previously discussed herein, the first water soluble salt and the second water soluble salt are selected such that a precipitate is formed upon contact. Thus, it is contemplated that any combination of water soluble salts capable of producing such solid precipitate may be utilized. As a non-limiting example, when calcium chloride contacts sodium carbonate, a precipitate, calcium carbonate results. Similar results may be observed with soluble sulfates, phosphates, hydroxides, and silicates.

The solid precipitate may be formed on one or more surfaces of the formation. The formation surfaces may be formed of a variety of materials, including silica, sandstone or shale, for example. Thus, as used herein, references to "surfaces of the formation" include interior pores as well as exterior surfaces of the materials.

First water soluble salts may include soluble calcium salts, soluble magnesium salts, soluble iron (II) salts, soluble iron (III) salts, and combinations thereof. In exemplary embodiments, the first water salts may include calcium chlorides, magnesium chlorides, ferrous chlorides, ferric chlorides, and combinations thereof.

Second water soluble salts may include soluble metal carbonates, soluble metal sulfates, soluble metal phosphates, soluble metal hydroxides, soluble metal silicates, soluble carbonates, soluble sulfates, soluble phosphates, soluble hydroxides, soluble silicates, and combinations thereof. More specifically but not limited thereto, second water soluble salt may be at least one selected from sodium carbonates, sodium sulfates, sodium phosphates, sodium hydroxides, sodium silicates, potassium carbonates, potassium sulfates, potassium phosphates, potassium hydroxides, potassium silicates, ammonium carbonates, ammonium sulfates, ammonium phosphates, ammonium hydroxides, ammonium silicates, and combinations thereof. Table 1 illustrates a variety of illustrative, non-limiting examples of salts and the resulting precipitates.

TABLE 1

| First Soluble Salt | Second Soluble Salt | Precipitate |
| --- | --- | --- |
| Calcium chloride | Sodium carbonate | Calcium carbonate |
| Calcium chloride | Sodium sulfate | Calcium sulfate |
| Calcium chloride | Sodium phosphate | Calcium phosphate |
| Calcium chloride | Sodium hydroxide | Calcium hydroxide |
| Calcium chloride | Sodium silicate | Calcium silicate |

Magnesium, iron (II), and iron (III) may replace the calcium in several of the listings in Table 1. Iron (II) may be used to make ferrous chloride (FeCl$_2$). Iron (III) may be used to make ferric chloride (FeCl$_3$). Also, potassium may replace the sodium in the table. It should be noted that iron sulfate and magnesium sulfate are water soluble.

In an embodiment, the soluble salts of the invention may be combined with a carrier in the amount of about 0.1 wt % to about saturation of the soluble salt in the carrier. In exemplary embodiments, the soluble salts of the invention may be combined with a carrier fluid in the amount of about 0.1 wt % to about 25%, 50%, or 75% of saturation of the soluble salt in the carrier.

The resulting precipitates may result in consolidation of sands in the formation, enhancement of the wellbore strength or combinations thereof, for example.

In an embodiment, the method may further include deconsolidating the formation by introducing an acid into the formation upon at least partial precipitation of the first fluid and second fluid. The deconsolidation process occurs when the solid precipitate is dissolved with an acid. Such deconsolidation processes may be useful when a zone or region that has been previously closed after using the precipitation methods discussed above needs to be reopened. The acid may be added as at least one of a pill, a hydrolysable in-situ acid generator, or combinations thereof. Acid pills may include HCl acid, formic acid, or any acid that dissolves the precipitate. The precipitates need to be dissolvable in the acids for deconsolidation to occur. Not all precipitates may be re-dissolved, including for example, phosphates such as iron phosphate and calcium phosphate.

The treatment methods and fluids used for deconsolidation may also include hydrolysable in-situ acid generating compounds. After combining these compounds with an aqueous solution (carrier), an acid is formed. The acid may form instantaneously, or the formation of the acid may take hours or days, for example. In some embodiments, the in-situ acid generating compounds are esters, aliphatic polyesters, ortho esters, which may be known as ortho ethers, poly (ortho esters), which may also be known as poly(ortho ethers), poly(lactides), poly(glycolides), poly(c-caprolactones), poly(hydroxybutyrates), poly(anhydrides), copolymers thereof, derivatives thereof or combinations thereof. The term "copolymer" as used herein is not limited to the combination of two polymers, but includes any combination of polymers, e.g., terpolymers. In several embodiments, the hydrolysable acid ester includes at least one member selected homo- and copolymers of lactic and glycolic acid, homo- and copolymers of vinyl methylsulphonate and vinyl methylphosphonate and dimethylphosphonate; and any combination thereof. Other suitable acid-generating compounds include: esters including, but not limited to, ethylene glycol monoformate, ethylene glycol diformate, diethylene glycol diformate, glyceryl monoformate, glyceryl diformate, glyceryl triformate, triethylene glycol diformate and formate esters of pentaerythritol. In various embodiments, an amount of the hydrolysable in-situ acid generating compound present in the deconsolidation treatment fluids ranges from about 1 wt. % to about 30 wt. %, alternatively, about 5 wt. % to about 20 wt. % alternatively about 10 wt. % to about 15 wt. % based on the total weight of carrier used in the deconsolidation treatment fluid.

Other Additives

In addition to the foregoing materials, it can also be desirable, in some embodiments, for other components to be present in the treatment methods and fluids. Such additional components can include, without limitation, surfactants, gelling agents, fluid loss control agents, proppants, corrosion inhibitors, rheology control modifiers or thinners, viscosity enhancers, temporary viscosifying agents, filtration control additives, high temperature/high pressure control additives, emulsification additives, surfactants, acids, alkalinity agents, pH buffers, fluorides, gases, nitrogen, carbon dioxide, surface modifying agents, tackifying agents, foamers, scale inhibitors, catalysts, clay control agents, biocides, bactericides, friction reducers, antifoam agents, bridging agents, dispersants, flocculants, $H_2S$ scavengers, $CO_2$ scavengers, oxygen scavengers, friction reducers, breakers, relative permeability modifiers, resins, wetting agents, coating enhancement agents, filter cake removal agents, surfactants, defoamers, shale stabilizers, oils, or combinations thereof. One or more of these additives (e.g., bridging agents) may comprise degradable materials that are capable of undergoing irreversible degradation downhole. A person skilled in the art, with the benefit of this disclosure, will recognize the types of additives that may be included in the fluids of the present disclosure for a particular application, without undue experimentation.

Methods of Use

The methods of the present invention may be employed in any subterranean treatment where a viscoelastic treatment fluid may be used. Suitable subterranean treatments may include, but are not limited to, drilling, fracturing treatments, sand control treatments (e.g., gravel packing), and other suitable treatments where a treatment fluid of the present invention may be suitable.

In addition to the fracturing fluids used in fracturing treatments, other fluids used in servicing a wellbore may also be lost to the subterranean formation while circulating the fracturing fluids in the wellbore. In particular, the other fluids may enter the subterranean formation via lost circulation zones for example, depleted zones, zones of relatively low pressure, zones having naturally occurring fractures, weak zones having fracture gradients exceeded by the hydrostatic pressure of the drilling fluid, and so forth.

A method of treating in a subterranean formation may include introducing a first fluid into a formation followed by a second fluid. The first fluid may be created by combining a first water soluble salt and a carrier. The second fluid may be created by combining a second water soluble salt and a carrier. The method may also include introducing the second fluid into the formation followed by introducing the first fluid into the formation.

The methods and fluids of the present application may also be used in drilling applications. The fluids may assist in carrying drill cuttings to the surface and stabilizing the wellbore. A method of stabilizing a wellbore during drilling of said wellbore through sandstone, carbonates, shale, and combinations thereof in a subterranean formation may include pausing drilling operations, introducing a first fluid into a formation followed by a second fluid, allowing a solid precipitate to form in-situ in the formation, and continuing the drilling operation. The method may also include introducing the second stream into the formation followed by introducing the first stream into the formation.

A method of shutting off and reopening a region in a formation including sandstone, carbonates, shale, and combinations thereof may include introducing a first fluid into a region of a formation followed by a second fluid, allowing a solid precipitate to form in-situ in the region of the formation, and introducing an acid into the region of the formation. The acid may be introduced as a pill, a hydrolysable in-situ acid generator, and combinations thereof.

The treatment fluids of the present invention may be prepared by any method suitable for a given application. For example, certain components of the treatment fluid may be provided in a pre-blended powder or a dispersion of powder in a nonaqueous liquid, which may be combined with the carrier at a subsequent time. After the preblended liquids and the aqueous base fluid have been combined other suitable additives may be added prior to introduction into the wellbore. Those of ordinary skill in the art, with the benefit of this disclosure will be able to determine other suitable methods for the preparation of the treatments fluids of the present invention.

In still another exemplary embodiment, the separate introduction of at least two of the treatment fluid components may be achieved by introducing the components within a single flowpath, but being separated by a spacer. Such a spacer may comprise a highly viscous fluid which substantially or entirely prevents the intermingling of the treatment fluid components while being pumped into a wellbore. Such spacers and methods of using the same are generally known to those of ordinary skill in the art.

In various embodiments, systems configured for delivering the treatment fluids described herein to a downhole location are described. In various embodiments, the systems can comprise a pump fluidly coupled to a tubular, the tubular containing the treatment fluids disclosed herein.

A wellbore treatment system may include an apparatus including a pump and a mixer to introduce a first fluid into a formation followed by a second fluid, and allow a solid precipitate to form in-situ in the formation.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In embodiments, the disclosed wellbore treatment fluid may be prepared at a well site or at an offsite location. Once prepared, a treatment fluid of the present disclosure may be placed in a tank, bin, boat, barge or other container for storage and/or transport to the site where it is to be used. In other embodiments, a treatment fluid of the present disclosure may be prepared on-site, for example, using continuous mixing, on-the-fly mixing, or real-time mixing methods. In certain embodiments, these methods of mixing may include methods of combining two or more components wherein a flowing stream of one element is continuously introduced into flowing stream of another component so that the streams are combined and mixed while continuing to flow as a single stream as part of the on-going treatment. The system depicted in FIG. 1 (described further below) may be one embodiment of a system and equipment used to accomplish on-the-fly or real-time mixing.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

Figure 1:
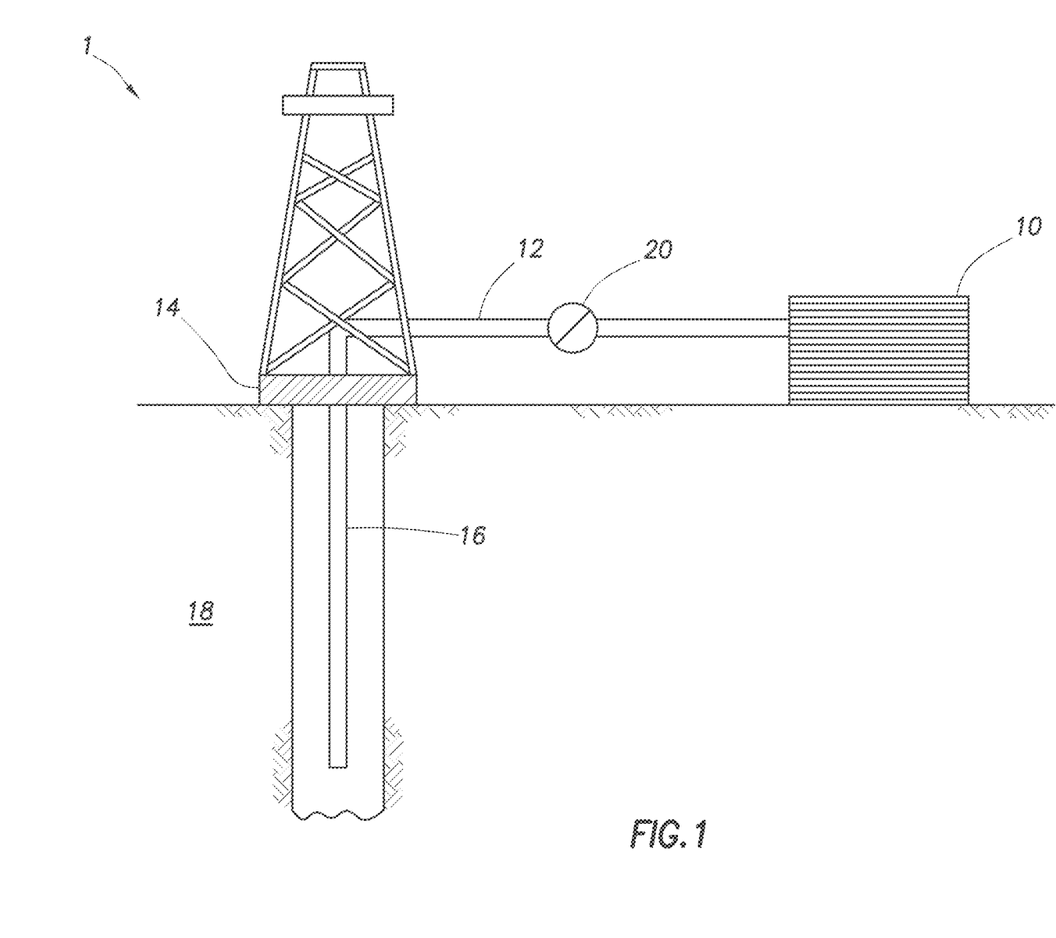
FIG. 1 depicts an embodiment of a system configured for delivering the treatment fluids of the embodiments described herein to a downhole location.

FIG. 1 shows an illustrative schematic of a system that can deliver treatment fluids of the embodiments disclosed herein to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the embodiments disclosed herein may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

The invention having been generally described, the following examples are given as particular embodiments of the invention and to demonstrate the practice and advantages hereof. It is understood that the examples are given by way of illustration and are not intended to limit the specification or the claims to follow in any manner.

EXAMPLES

Consolidation and Enhancement
Compositions:
1 molar solution of sodium carbonate and calcium chloride
Experimental Procedure:
1. Sodium carbonate and calcium carbonate were combined in the presence of loose sand.

Figure 2A:
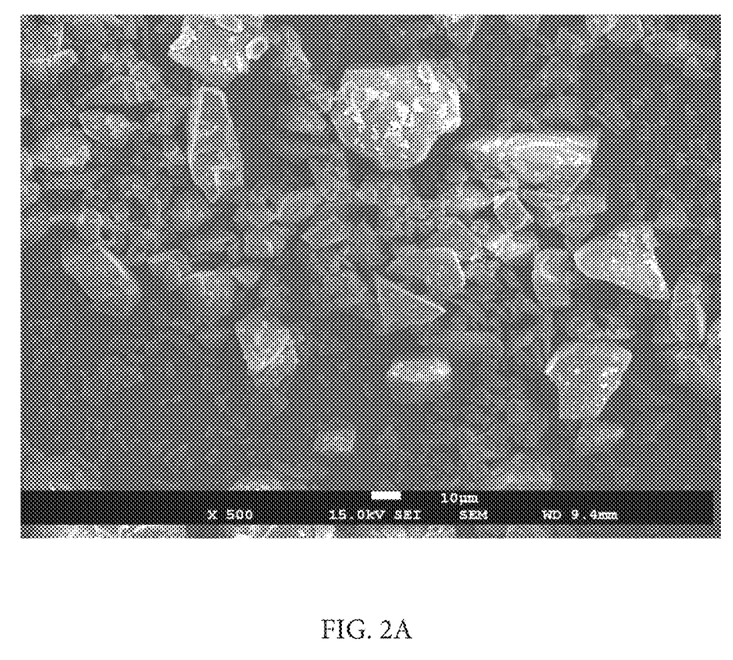
FIGS. 2A-C illustrate SEM images of silica sand particles before and after the precipitation of $CaCO_3$.
Figure 2B:
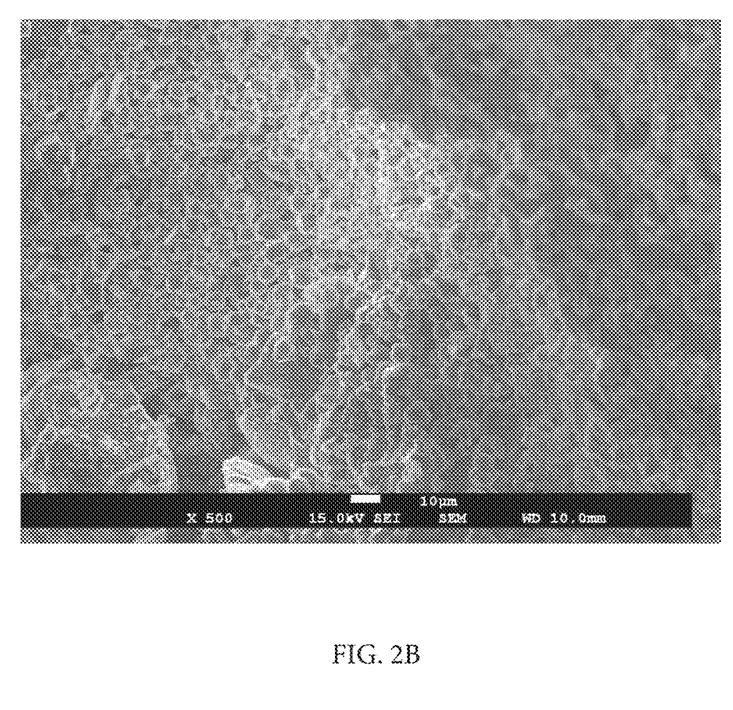
Figure 2C:
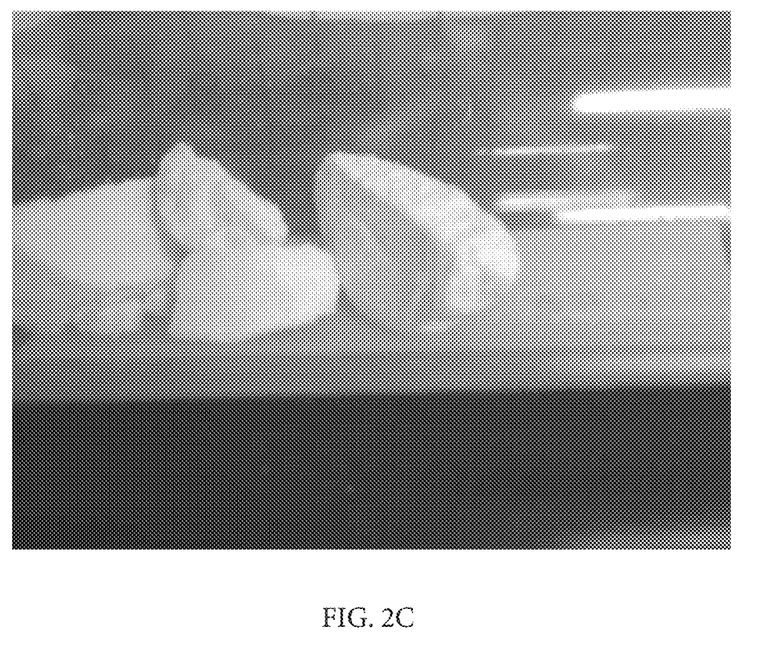

As seen in FIGS. 2A and B, the loose sand before the precipitate is formed (FIG. 2A) is consolidated after the precipitation (FIG. 2B). FIG. 2C shows the consolidation of the loose sand after the sample has been dried. The results illustrate that the calcium carbonate precipitate successfully consolidated loose sand.

Figure 3A:
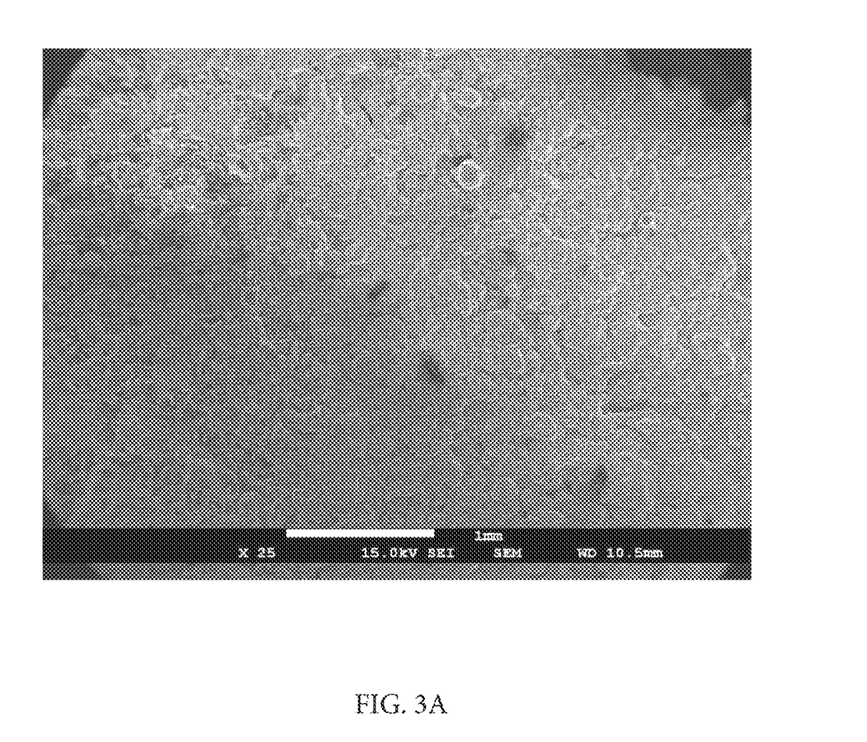
FIGS. 3A-B illustrate SEM images of a sandstone core after the precipitation of $CaCO_3$.
Figure 3B:
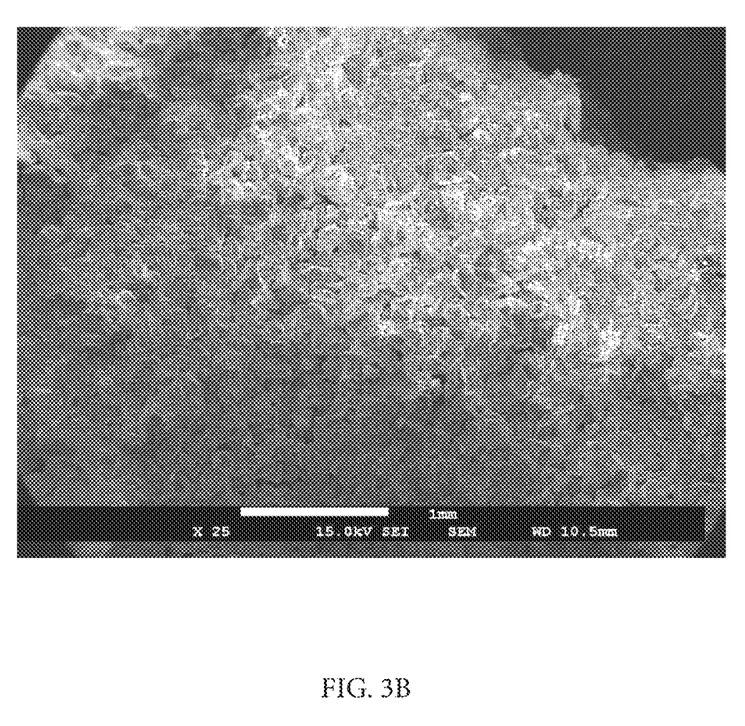

2. A sandstone core sample was submerged in a sodium carbonate solution and then transferred to a calcium carbonate solution. The sample was kept in the solution in an oven a 150° F. (66° C.) overnight.
Results Precipitation occurred instantly, in less than one second, upon contact with the calcium carbonate solution, on the outside of the core surface as seen in FIG. 3A. The process of $CaCO_3$ crystal growth after the initial precipitation (nucleation), may take longer depending on the reaction conditions. Precipitation was also observed inside the core sample as illustrated in FIG. 2B. Because porosity of the core sample significantly decreased after treatment, one of skill in the art may expect the enhancement of the core strength.

Embodiments disclosed herein include:

A: A method of treating a wellbore in a subterranean formation comprising introducing a first fluid into a formation, wherein the first fluid comprises a first water soluble salt and a carrier; introducing a second fluid into the formation, wherein the second fluid comprises a second water soluble salt and a carrier, and wherein the first fluid and second fluid produce a solid precipitate upon contact; and allowing the solid precipitate to form in-situ in the formation.

B: A method for stabilizing a wellbore during drilling of said wellbore through a material selected from sandstone, carbonates, shale, and combinations thereof in a subterranean formation comprising a material selected from sandstone, carbonates, shale, and combinations thereof, said method comprising pausing a drilling operation; introducing a first fluid into a formation, wherein the first fluid comprises a first water soluble salt and a carrier; introducing a second fluid into the formation, wherein the second fluid comprises a second water soluble salt and a carrier, and wherein the first fluid and second fluid produce a solid precipitate upon contact; allowing the solid precipitate to form in-situ in the formation; and continuing the drilling operation.

C: A method of shutting off and reopening a region in a formation comprising a material selected from sandstone, carbonates, shale, and combinations thereof, said method comprising introducing a first fluid into a region in the formation, wherein the first fluid comprises a first water soluble salt and a carrier; introducing a second fluid into the region of the formation, wherein the second fluid comprises a second water soluble salt and a carrier, and wherein the first fluid and second fluid produce a solid precipitate upon contact; allowing the solid precipitate to form in-situ in the region of the formation; and introducing an acid into the region of the formation.

D: A well treatment system comprising: a well treatment apparatus, including a pump and a mixer to introduce a first fluid into a formation, wherein the first fluid comprises a first water soluble salt and a carrier; introduce a second fluid into the formation, wherein the second fluid comprises a second water soluble salt and a carrier, and wherein the first fluid and second fluid produce a solid precipitate upon contact; and allow the solid precipitate to form in-situ in the formation.

Each of embodiments A, B, C and D may have one or more of the following additional elements in any combination: Element 1: wherein the first water soluble salt is selected from soluble calcium salts, soluble magnesium salts, soluble iron (II) salts, soluble iron (III) salts, and combinations thereof. Element 2: wherein the first water soluble salt is selected from calcium chlorides, magnesium chlorides, ferrous chlorides, ferric chlorides, and combinations thereof. Element 3: wherein the second water soluble salt is selected from soluble metal carbonates, soluble metal sulfates, soluble metal phosphates, soluble metal hydroxides, soluble metal silicates, soluble carbonates, soluble sulfates, soluble phosphates, soluble hydroxides, soluble silicates, and combinations thereof. Element 4: wherein the second water soluble salt is selected from sodium carbonates, sodium sulfates, sodium phosphates, sodium hydroxides, sodium silicates, potassium carbonates, potassium sulfates, potassium phosphates, potassium hydroxides, potassium silicates, ammonium carbonates, ammonium sulfates, ammonium phosphates, ammonium hydroxides, ammonium silicates, and combinations thereof. Element 5: wherein the second fluid is introduced into the formation before the first fluid is introduced into the formation. Element 6: wherein the solid precipitate is selected from calcium carbonates, calcium sulfates, calcium phosphates, calcium hydroxides, calcium silicates, magnesium carbonates, magnesium phosphates, magnesium hydroxides, magnesium silicates, ferrous carbonates, ferrous phosphates, ferrous hydroxides, ferrous silicates, ferric carbonates, ferric phosphates, ferric hydroxides, ferric silicates, and combinations thereof. Element 7: wherein the solid precipitate is formed on a surface of a material in the formation. Element 8: wherein the material is selected from sandstone, carbonates, shale and combinations thereof. Element 9: wherein the surface is selected from inner pores, exterior surfaces of the material, and combinations thereof. Element 10: wherein the solid precipitate enhances the wellbore strength. Element 11: further comprising deconsolidating the formation by introducing an acid into the formation upon formation of the solid precipitate. Element 12: wherein the acid is introduced as at least one of a pill, a hydrolysable in-situ acid generator, and combinations thereof. Element 13: wherein the carrier is selected from fresh water, sea water, brines containing at least one dissolved organic or inorganic salt, liquids containing water miscible organic compounds, and combinations thereof.

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A method for stabilizing a wellbore during drilling in a subterranean formation, the method comprising:

pausing a drilling operation;
introducing a first fluid into a rock matrix of a formation, wherein the first fluid comprises a first water soluble salt and a first carrier;
introducing a second fluid into the rock matrix of the formation, wherein the second fluid comprises a second water soluble salt and a second carrier, and wherein the first fluid and second fluid produce a solid precipitate upon contact, wherein the solid precipitate comprises at least one of calcium carbonate, calcium sulfate, calcium phosphate, or calcium hydroxide;
allowing the solid precipitate to consolidate to form in-situ in the rock matrix of the formation and enhance a strength of the rock matrix of the formation; and
continuing the drilling operation.

2. The method of claim 1, wherein the first water soluble salt comprises at least one of soluble calcium salt, soluble magnesium salt, soluble iron (II) salt, soluble iron (III) salt, or any combination thereof.

3. The method of claim 1, wherein at least one of the first water soluble salt or the second water soluble salt comprises at least one of magnesium chloride, ferrous chloride, ferric chloride, or any combination thereof.

4. The method of claim 1, wherein the second water soluble salt comprises at least one of soluble metal carbonate, soluble metal sulfate, soluble metal phosphate, soluble metal hydroxide, soluble metal silicate, soluble carbonate, soluble sulfate, soluble phosphate, soluble hydroxide, soluble silicate, or any combination thereof.

5. The method of claim 1, wherein at least one of the first water soluble salt or the second water soluble salt comprises at least one of sodium carbonate, sodium sulfate, sodium phosphate, sodium hydroxide, sodium silicate, potassium carbonate, potassium sulfate, potassium phosphate, potassium hydroxide, potassium silicate, ammonium carbonate, ammonium sulfate, ammonium phosphate, ammonium hydroxide, ammonium silicate, or any combination thereof.

6. The method of claim 1, wherein the solid precipitate is formed in a rock matrix comprising at least one of sandstone, carbonate, shale, or any combination thereof in the formation, and wherein the rock matrix includes one or more inner pores.

7. The method of claim 1, further comprising introducing an acid into the formation upon at least partial precipitation of the first fluid or the second fluid, the acid comprising at least one of an acid pill or a hydrolysable acid ester.

8. The method of claim 1, wherein the solid precipitate is formed within inner pores of the rock matrix and on an exterior surface of the formation.

9. The method of claim 1, wherein the first carrier comprises an aqueous carrier, and wherein the first water soluble salt is dissolved in the first carrier.

10. The method of claim 1, wherein at least one of the first carrier or the second carrier comprises at least one of fresh water, sea water, brines containing at least one dissolved organic or inorganic salt, a liquid containing a water miscible organic compound, or a combination thereof.

11. The method of claim 1, wherein introducing the first fluid and the second fluid into the rock matrix of the formation comprises introducing the first fluid and the second fluid within a single flowpath and separated within the single flowpath via spacer.

12. The method of claim 11, wherein the spacer used to separate the first fluid and the second fluid within the single flowpath comprises a viscous fluid that at least partially prevents intermingling of the first fluid and the second fluid while the first fluid and the second fluid are pumped into the rock matrix of the formation.

13. A wellbore treatment system comprising:
an apparatus configured to:
pause a drilling operation;
introduce a first fluid into a rock matrix of a formation, wherein the first fluid comprises a first water soluble salt and a first carrier;
introduce a second fluid into the rock matrix of the formation, wherein the second fluid comprises a second water soluble salt and a second carrier, wherein the first fluid and second fluid produce a solid precipitate upon contact, the solid precipitate comprising at least one of calcium carbonate, calcium sulfate, calcium phosphate, or calcium hydroxide;
allow the solid precipitate to consolidate to form in-situ in the rock matrix of the formation and enhance a strength of the rock matrix of the formation; and
continue the drilling operation.

14. The method of claim 1, wherein the solid precipitate is formed on a surface of a material in the rock matrix of the formation, and wherein the surface comprises at least one of one or more inner pores, an external surface of a material, or a combination thereof.

15. The wellbore treatment system of claim 13, further comprising a pump and a mixer configured to introduce the first fluid and introduce the second fluid.

16. The wellbore treatment system of claim 13, wherein the first water soluble salt comprises at least one of soluble magnesium salt, soluble iron (II) salt, soluble iron (III) salt, or any combination thereof.

17. The wellbore treatment system of claim 13, wherein at least one of the first water soluble salt or the second water soluble salt comprises at least one of magnesium chloride, ferrous chloride, ferric chloride, or any combination thereof.

18. The wellbore treatment system of claim 13, the apparatus further configured to deconsolidate the consolidated solid precipitate within the rock matrix of the formation by introducing an acid into the rock matrix of the formation upon at least partial precipitation of the first fluid or the second fluid, the acid comprising at least one of an acid pill or a hydrolysable acid ester.

19. The wellbore treatment system of claim 13, wherein introducing the first fluid and the second fluid into the rock matrix of the formation comprises introducing the first fluid and the second fluid within a single flowpath and separated within the single flowpath via spacer.

20. The wellbore treatment system of claim 19, wherein the spacer used to separate the first fluid and the second fluid within the single flowpath comprises a viscous fluid that at least partially prevents intermingling of the first fluid and the second fluid while the first fluid and the second fluid are pumped into the rock matrix of the formation.

* * * * *